Nov. 20, 1934. H. F. ROHRDANZ 1,981,332
FILM SPLICER
Filed May 7, 1932 2 Sheets-Sheet 2

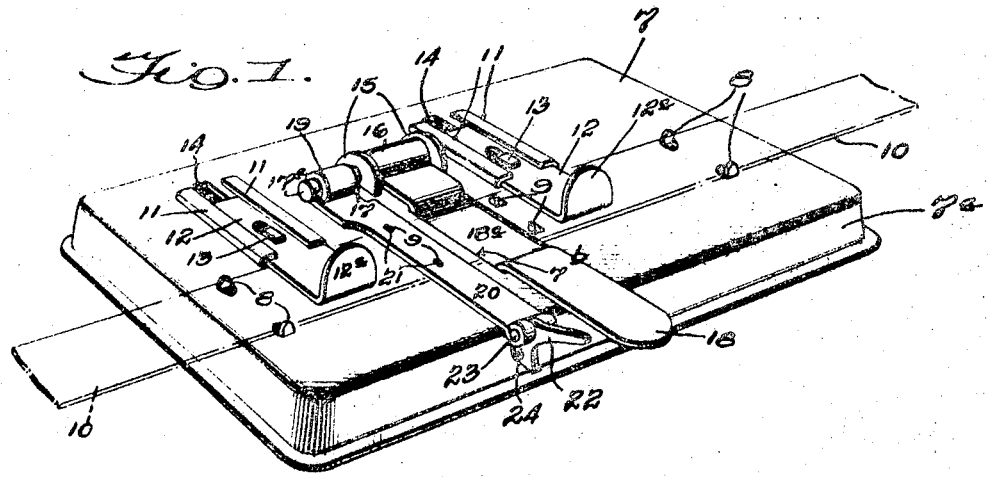
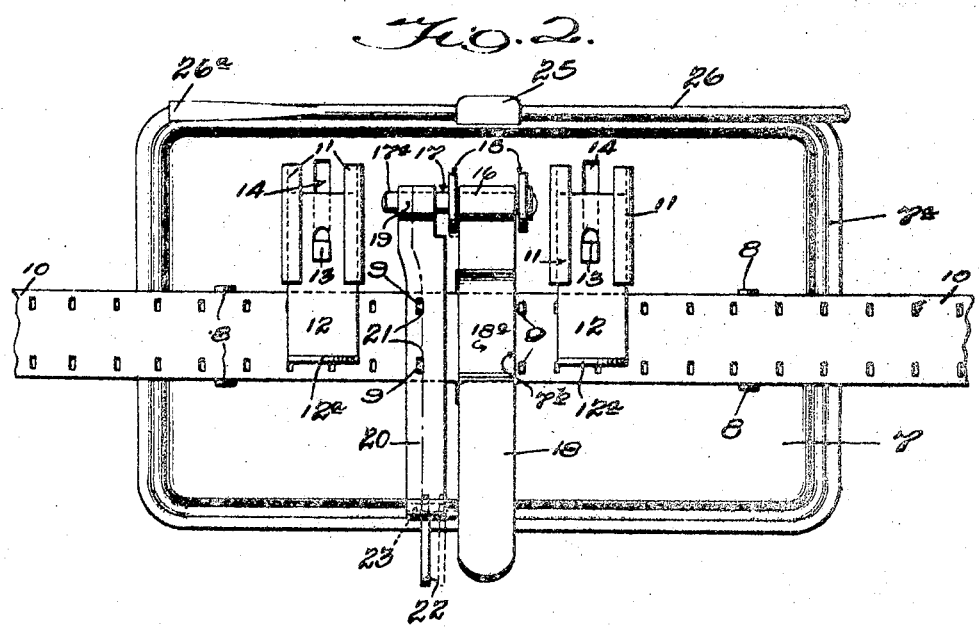

Patented Nov. 20, 1934

1,981,332

UNITED STATES PATENT OFFICE 1,981,332

FILM SPLICER

Harold F. Rohrdanz, Inglewood, Calif.

Application May 7, 1932, Serial No. 609,941

19 Claims. (Cl. 154—42)

My invention relates to improvements in splicers and has particular reference to one which is adapted for cutting and splicing a motion picture film.

The invention has for a general object to provide a greatly simplified device of this character, the operation of which is fool proof, and through the use of which but one section of film need be moved but a single time during the period occupied by the cutting, scraping and splicing operation,—the device comprehending but few simple parts which enable it to be made very small and compact, and the construction and arrangement being such that there is virtually nothing to get out of order.

A further and more specific object is to provide in a device of this kind a novel means which has the combined functions of holding a film section in place while it is being cut; that of serving as a gauge to determine the exact portion of a film section from which the emulsion is to be scraped to provide the cement receiving surface, and finally which serves as a presser for compressing the overlapped film portions after the cement has been interposed therebetween.

Another object of the invention is to provide in a device of the character described novel film severing means whereby ends of two film sections may be cut off simultaneously and automatically disposed of, said severing means being formed so as to provide a space below one film section (after the same has been shifted so that one end overlaps that of the other section) so that it may be readily lifted to enable cement to be applied to the subjacent portion of the other film section.

The invention also resides in certain novel features of construction, combination and arrangement of the various parts and in methods of use,—all of which will be readily apparent from the following description taken in connection with the accompanying drawings.

It is to be understood that the disclosures herein are directed to what appears to be a preferred example of the invention although obviously various changes and modifications may be made within the spirit and scope of the subject matter claimed hereinafter.

In the drawings, wherein the same reference characters have been used to designate the same parts in all views, Figure 1 is a perspective view illustrating a film splicer and cutter embodying my invention;

Figure 2 is a top plan view illustrating the parts in the position they assume when the adjacent ends of two film sections are being severed;

Figure 3 is a perspective view of a scraper element;

Figure 4 is a central longitudinal sectional view through the device;

Figure 5 is a cross sectional view taken on the line 5—5 of Figure 4;

Figure 6 is a cross sectional view taken on the line 6—6 of Figure 4;

Figure 7 is a cross sectional view taken on the line 7—7 of Figure 4.

Referring to the drawings by reference characters, numeral 7 denotes a substantially rectangular base having a downturned marginal supporting flange 7a.

The upper surface of the base 7 adjacent each end is provided with a pair of opposed upwardly struck guide lugs 8 for engaging the side edges of the film sections 10 whose adjacent ends are to be severed.

Figures 1 and 2 clearly show that the base is provided with two pairs of upstanding pins 9 which are adapted to extend through the pairs of marginal holes 10a, of the film so as to hold the same against shifting movement on the base while the cutting operation is taking place. In this connection, it is to be observed that there is a clamp slide 12 for each film section 10,—each of such slides working in a slide-way 11 transversely of the base and having its outer end turned up as at 12a to provide a finger piece for ready operation. The slides 12 are confined within the limits of their guides 11 by means of a downturned tongue 13, working in a slot 14 extending transversely of the base 7, as best shown in Figures 1, 2 and 5. The obvious function of the slides 12 is to hold the film sections 10 down so as to prevent disengagement from the pins 9.

Located between the slideways 11 are the bearing ears 15 whose opposed apertures carry the rotatable and axially slidable shaft 17 whose portion intermediate the ears 15 extends loosely through the curled rear or bearing end 16 of the film severing member 18 which, as will be observed particularly from Figures 1 and 7 has the intermediate downwardly offset film severing portion 18a which cooperates with the side edges of the cut-out 7b of base 7 for severing the frayed ends of the film sections 10. Obviously the film sections 10 upon being severed will drop down onto the surface beneath the base 7 so as not to interfere with the subsequent scraping and splicing operations. It is to be observed that the sides of the cutting portion 18a cooperate with the walls of the cut-out 7b after the fashion of the blades of a pair of shears.

Particular emphasis is made to the fact that one end of the shaft 17 extends a substantial distance beyond the adjacent bearing ear 15 and has rigidly secured thereon the rear end 19 of a combined clamping, gauge and presser lever 20 extending transversely of the base 7 and having opposed holes 21 adapted, as shown in Figures 1 and 2, to receive the subjacent film holding pins 9 when such lever is in its film clamping and gauge functioning position as depicted in the drawings.

The shaft-carried end of the lever 20 abuts the head 17a of the shaft 17 at one side, and it is to be noted that the outward lineal movement of said shaft 17 is limited by a head 17b at its opposite end. The width of the bearing end of the lever 20 is less than the maximum projection of the shaft head 17a away from the adjacent ear 15, thus permitting lever 20 to be shifted inwardly so that one edge will lie substantially flush with the adjacent wall of the opening 7b while the other edge will lie substantially flush with the adjacent sides of the film holding pins 9.

From what has been said above it will be evident that after the frayed ends of the film sections 10 have been severed by the member 18, the lever 20 serves as a gauge to accurately define the area from which the emulsion is to be scraped said area being that exposed between 20 and 18 (Fig. 2).

The emulsion having been scraped off the left hand film section 10 at the site of the joint or splice, the right hand slide 12 (Fig. 2) is moved rearwardly off of its film section 10 which is thereupon raised and disengaged from the right hand set of pins 9 and shifted leftwardly (Fig. 2) until its end abuts the adjacent edge of the lever 20 to overlap the adjacent end of the left hand film section 10.

Particular attention is invited to the fact that the distance from the right hand set of pins 9 (Fig. 2) to the adjacent edge of lever 20, in its full line or gaging position, is equal to twice the lineal distance between two sets of marginal film holes 10a (Fig. 2). Thus, when the end of the right hand film section is moved to overlap the scraped end of the left hand section and to abut the lever 20, the right hand pins 9 will be in a position to engage a pair of film holes 10a.

The sliding of the right hand film section 10 to this position may be readily accomplished, as it will be evident from Figs. 1 and 7 that there is no intervening obstruction since the upper surface of the downwardly offset cutting portion 18a of member 18 does not project above the plane of the surface 7 and is in fact disposed below such surface for reasons that will presently appear.

The ends of the film sections having been overlapped as aforesaid, it is a simple matter to lift the overlapped portion of the film 10 away from the scraped surface of the other section and apply cement to the latter. The fact that the upper surface of the cutting portion 18a is below the surface of the base 10 enables the scraper 26 to be readily slid under the overlapping portion of the right hand film section 10 to lift it.

After the cement has been applied, the overlapped film portion 10 is allowed to drop into place whereupon the latch 22 which is pivoted as at 23 to the end of lever 20 is disengaged from the lug 24 of supporting flange 7a and the lever 20 is lifted and slid rightwardly (Fig. 2) until its bearing end 19 abuts the adjacent ear 15. Then the lever 20 is depressed to firmly compress the overlapping ends of the film together to cause effective action of the cement, and if desired the latch 22 may again be engaged with lug 24 to hold said lever in splice-clamping position. As previously explained, the shaft-carried end 19 of lever 20 cooperating with the adjacent ear 15 and the subjacent pins 9 makes it absolutely impossible for the lever 20 to be brought downwardly upon any portion of the film other than that exact area which has been previously scraped and coated with cement.

The scraper employed is illustrated in Fig. 3 and is seen to comprise the rod 26 having the flattened and sharpened end 26a.

In order that the scraper will always be handy and available for use, I provide the keeper clamp 25 at one side of the base 7 and which cooperates with the bottom outward curl of the supporting flange 7a in holding the scraper. The clamp 25 is carried by the undersurface of the base 7 and may be secured to a block 25a as shown, such clamp 25 extending outwardly through the hole 25b in flange 7a as best shown in Figure 7.

From the foregoing description it is believed that the advantages ascribed to the device in the introductory part of this specification will be readily understood and appreciated by those skilled in the art.

While the device is preferably made out of metal, it may be feasible and equally satisfactory to use other material. The description of course has been specific to the form of the device shown, although same is to be taken merely as illustrative of my inventive conception. The invention is not to be taken as limited to the simultaneous cutting of film sections, and various instrumentalities are understood to be useful in combinations less than the whole.

The operation of the device may be summarized as follows:

1st. The clamp slides 12 are pushed back as far as possible out of the way; the latch 22 released and the arm 20 swung back to its inoperative position; and the cutting member 18 is taken by its protruding free end and swung back to its inoperative position.

2nd. The left portion of the film 10 (Fig. 2) is attached to the device in the manner illustrated (between guides 8, 8, and on pins 9, with its ragged end extending into the scrap-receiving hole 7, whereupon the adjacent clamp slide 12 is pushed down over said left hand film section 1 to securely hold same. The right portion of film is attached in the same manner.

3rd. The lever 20 is now swung down to its extreme left position, with the subjacent pins 9 protruding through openings 21, as shown in Fig. 1, and fastened securely by way of latch 22, 24.

4th. With the ragged ends of film sections 10, 10 extended partly over the scrap-receiving hole 7, the cutting member 18 is now swung down to the position shown in Fig. 1, to sharply cut off the ragged edges of film section 10, 10, said cutting member 18 remaining in this closed position during the entire remaining operations.

5th. The scraper 26 (Fig. 3) is now used to scrape the emulsion from that portion of the left section of film extending beyond the inner edge of the lever 20.

6th. The right hand clamp slide 12 (Fig. 2) is now pushed back and the right hand portion of film (Fig. 2) lifted from its anchor pins 9 on the base 7, said film being now shifted to the left till its newly-cut edge rests against the inner edge of lever 20, overlapping scraped part of the left portion of film. Then said right film section 10 is again placed down on the subjacent holding pins 9 which engage through aligned perforations 10a in the longitudinal edge of film. The clamp slide 12 is now again pushed over the right portion of film to hold it.

7th. The scraper 26 is now taken in the right hand and the knife end slipped under the overlapping section of film by way of the depression 18a in cutting member 18; said right hand section of film being raised in this manner and held up while cement is applied with the left hand to the exposed scraped section of the left film section 10. Then the scraper is put aside and film allowed to again rest in overlapping position on the cemented area.

8th. Now the lever 20 is utilized as a presser, being released from its first position by way of latch 22. Lever 20 is now raised clear of film and pushed the allowed space to the right over the joined ends of film and then lowered to be brought into pressure bearing contact with the spliced portion of film. In this position, the lever 20 is again securely fastened by way of the latch 22.

After the few moments required for the cement to dry, clamp slide plates 12 are pushed back off the film, the lever 20 is released and swung back to its inoperative position, and the film removed with the splice now perfectly completed.

I claim as my invention:

1. A device of the class described comprising a base, a cutter carried by said base and a combined film holding, presser and gauge member at one side of said cutter and movable toward and from the same.

2. A device of the class described comprising a base, a cutter carried by said base, a combined film holding, presser and gauge member at one side of said cutter and movable toward and from the same, and said combined film holding, presser and gauge member being swingably carried by said base.

3. A device of the class described comprising a base, a cutter carried by said base, a combined film holding, presser and gauge member movable toward and from said cutter, and said cutter and combined film holding, presser and gauge member being co-axially carried by said base for swinging movement, the cutter being confined against lateral shifting movement.

4. A device of the class described comprising a base, a cutter carried by said base, a combined film holding, presser and gauge member movable toward and from said cutter, and said cutter and combined film holding, presser and gauge member being co-axially carried by said base for swinging movement, the cutter being confined against lateral shifting movement, and said base having a cut-out cooperating with an edge of said cutter in the severing of the work.

5. In a device of the class described having a base and work-severing means, work clamping means adjacent said severing means, a limitedly shiftable support for said clamping means operating transversely with respect to said severing means, one edge of said clamping means being spaced laterally from the cutter in one extreme position of the support whereby to provide a splice-length-indicating gauge and film-end stop, and said edge in the other extreme position of said support lying flush with said severing means whereby said clamping means may overlie the spliced ends of the work.

6. In a device of the class described having a base and work-severing means, work clamping means adjacent said severing means, a limitedly shiftable support for said clamping means operating transversely with respect to said severing means, one edge of said clamping means being spaced laterally from the cutter in one extreme position of the support whereby to provide a splice-length-indicating gauge and film-end stop, said edge in the other extreme position of said support lying flush with said severing means whereby said clamping means may overlie the spliced ends of the work, and means for preventing said clamping means from engaging the film except at said extreme positions of said clamping means support.

7. In a device of the class described having a base and work-severing means, work clamping means adjacent said severing means, a limitedly shiftable support for said clamping means operating transversely with respect to said severing means, one edge of said clamping means being spaced laterally from the cutter in one extreme position of the support whereby to provide a splice-length-indicating gauge and a film-end stop, said edge in the other extreme position of said support lying flush with said severing means whereby said clamping means may overlie the spliced ends of the work, and film engaging holding means cooperating with said clamping means in each extreme position to hold the film against shifting, and preventing the clamping means from engaging the film except at said extreme positions of said support.

8. In a film splicing device or the like comprising a base, a film engaging member swingably and slidably carried by said base.

9. In a film splicing device or the like comprising a base, a film engaging member swingably and slidably carried by said base, means for limiting the sliding movement of said member whereby at one extreme position one edge of the member provides a gauge for defining the length of the splice and a stop for the end of one film section, the member at the other limit of its sliding movement overlying the splice.

10. In a device of the class described, a base, a swingable cutter carried thereby, and a combined splice limit defining and splice compressing member movable on said base into one position to define a splice and into another and different position to compress a splice.

11. In a device of the class described, a base, a swingable cutter carried thereby, a combined splice limit defining and splice compressing member movably carried by said base, and means on said member for locking said member against the film.

12. In a device of the class described, a base, a swingable cutter carried thereby, a combined splice limit defining and splice compressing member movably carried by said base, and film holding means including movable members carried by said base.

13. A device of the class described comprising a base having a rectangular cut-out, aligned pairs of film-guiding elements at opposite sides of said cut-out and adjacent the remote ends of said base, a film confining slide member at each side of said cut-out and working transversely of the base, a pair of film-securing pins at each side of said cut-out and spaced therefrom, said slide members holding the film between said guides and in engagement with said pins, a pair of spaced bearing ears arranged opposite said cut-out and adjacent one side of said base, an axially shiftable shaft carried in said bearing ears and having headed ends, the length of said shaft being substantially greater than the distance between said ears so that one end of the shaft may be projected considerably beyond the outer surface of one of the ears, a film severing member pivoted on said shaft between said ears, said film severing member having a downwardly offset intermediate cutting portion of a width equal to the width of said cut-out and adapted to be swung thereinto, the side edges of said downwardly offset cutting portion cooperating with the sides of said cut-out for shearing off the frayed ends of a pair of film sections when the cutting element is operated, and a combined film holding, presser and gauge member fixedly secured to said shaft adjacent one headed end thereof.

14. The combination set forth in claim 13, and said combined film holding presser and gauge member being of a width equal to the length of the splice whereby to completely overlie the same when in splice pressing position.

15. The combination set forth in claim 13, and said combined film holding presser and gauge member being of a width equal to the length of the splice whereby to completely overlie the same when in splice compressing position, and said member in its other position having a longitudinal edge spaced from said base cut-out whereby to provide a splice length defining gauge for facilitating scraping and splicing of the film.

16. A device of the class described comprising a base, a cutter carried by said base, film anchoring elements carried by said base adjacent the cutter, a combined splice limit defining gage member and splice compressing member, and said film anchoring elements cooperating with said member to define its splice compressing and splice gaging positions respectively.

17. In a device of the class described, a base, a combined splice limit defining and splice compressing member, and means on said base adapted to cooperate with said member to selectively maintain the same in splice limit defining and splice compressing positions.

18. In a device of the class described, a base, a cutter carried thereby, a combined splice limit defining and splice compressing member, and means carried by said base at one side of the cutter for defining different positions of said member laterally of the cutter.

19. In a device of the class described, a base, a cutter carried thereby, a combined splice limit defining and splice compressing member, and means carried by said base at one side of the cutter for clamping said member against said base at different points laterally of the cutter.

HAROLD F. ROHRDANZ.